(12) United States Patent
Fouarge (10) Patent No.: US 8,258,245 B2
(45) Date of Patent: Sep. 4, 2012

(54) METHOD AND DEVICE FOR OPTIMISING CATALYST SUPPLY TO A POLYMERISATION REACTOR

(75) Inventor: Louis Fouarge, Dilbeek (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 0 days.

(21) Appl. No.: 12/778,401

(22) Filed: May 12, 2010

(65) Prior Publication Data

US 2010/0267904 A1 Oct. 21, 2010

Related U.S. Application Data

(60) Continuation of application No. 11/499,043, filed on Aug. 1, 2006, now abandoned, and a continuation of application No. 12/243,346, filed on Oct. 1, 2008, now abandoned, which is a division of application No. 11/057,715, filed on Feb. 14, 2005, now abandoned.

(60) Provisional application No. 60/544,846, filed on Feb. 13, 2004.

(30) Foreign Application Priority Data

Feb. 13, 2004 (EP) .................................... 04100569

(51) Int. Cl.
*C08F 4/00* (2006.01)
*C08F 4/12* (2006.01)
*B01J 19/00* (2006.01)

(52) U.S. Cl. ............................ 526/90; 526/226; 422/131
(58) Field of Classification Search ................... 526/90, 526/226; 422/131
See application file for complete search history.

(56) References Cited

U.S. PATENT DOCUMENTS 4,780,513 A * 10/1988 Powers et al. ................... 526/88
2003/0114608 A1 * 6/2003 Tharappel et al. ............... 526/64

* cited by examiner

*Primary Examiner* — William Cheung (57) ABSTRACT

Methods for supplying a catalyst to an ethylene slurry loop polymerization reactor and polymers formed therefrom are described herein. The method generally includes preparing a catalyst slurry in a preparation vessel wherein the slurry includes a hydrocarbon diluent liquid which contains a Ziegler-Natta catalyst; supplying the catalyst slurry from the preparation vessel to a buffer vessel; withdrawing the catalyst slurry from the buffer vessel and supplying the catalyst slurry to a slurry loop polymerization reactor in which ethylene is polymerized; mixing a co-catalyst with the Ziegler Natta catalyst in the slurry prior to the supplying of the catalyst slurry to the slurry loop polymerization reactor; and controlling the transfer of catalyst slurry from the preparation vessel to the buffer vessel and the withdrawal of catalyst slurry from the buffer vessel to maintain the level of catalyst slurry in the buffer vessel substantially constant relative to the level of catalyst slurry in the preparation vessel.

12 Claims, 2 Drawing Sheets

METHOD AND DEVICE FOR OPTIMISING CATALYST SUPPLY TO A POLYMERISATION REACTOR

CROSS-REFERENCE TO RELATED APPLICATIONS

This application claims the benefit of U.S. patent application Ser. No. 11/499,043, filed Aug. 1, 2006 and U.S. patent application Ser. No. 12/243,346, filed Oct. 1, 2008, which claims priority from U.S. patent application Ser. No. 11/057,715, filed Feb. 14, 2005 (now abandoned), which claims priority from U.S. Pat. Appl. Ser. No. 60/544,846, filed Apr. 8, 2008 (now abandoned).

FIELD OF THE INVENTION

This invention relates to catalytic reactions. In a first aspect, the invention relates to a method for optimising the supply of catalyst to a polymerisation reactor. In another aspect the invention relates to a device for preparing and supplying a catalyst to a polymerisation reactor.

BACKGROUND

Polyethylene (PE) is synthesized via polymerizing ethylene ($CH_2$=$CH_2$) monomers. Because PE is cheap, safe, stable to most environments and easy to be processed polyethylene polymers are useful in many applications. According to the synthesis methods, PE can be generally classified into several types such as LDPE (Low Density Polyethylene), LLDPE (Linear Low Density Polyethylene), and HDPE (High Density Polyethylene). Each type polyethylene has different properties and characteristics.

It is known that the polymerization of olefins, e.g. ethylene, involves the polymerization of olefin monomer with the aid of an organometallic catalyst of Ziegler-Natta and a co-catalyst. Catalyst systems for polymerization and co-polymerization of olefins known as Ziegler-Natta systems consist on the one hand, as catalyst, of compounds of transition metals belonging to Groups IV to VII of the periodic table of elements, and on the other hand, as co-catalysts, of organometallic compounds of metals of Groups I to III of this Table. The catalysts most frequently used are the halogenated derivatives of titanium and vanadium, preferably associated with compounds of magnesium. Moreover, the co-catalysts most frequently used are organoaluminum or organozinc compounds. When the catalyst is highly active, especially when it is employed in the presence of a large quantity of co-catalyst, a formation of polymer agglomerates, which may be considerable, can be observed. In a typical Ziegler-Natta catalysis system the monomer, e.g. ethylene or propylene, is bubbled into the suspended catalyst and the ethylene or propylene rapidly polymerizes to a high molecular weight linear polyethylene or polypropylene. A characteristic of all Ziegler-Natta catalysts is that they all yield straight chain polymers.

The use of Ziegler-Natta-catalysts in a polymerization method has been improved over a number of generations since the initial work by Ziegler and Natta in the 1950s. Seeking to increase both the activity and the stereoselectivity has been the driving force for the continuous development of the catalyst system. In addition to the support material, this comprises as actual catalyst a transition metal compound, e.g. a titanium compound, which is activated only by addition of an aluminium-containing co-catalyst.

In employing Ziegler-Natta catalysts, it has been customary to inject the catalyst as a slurry in a diluent into a reaction zone of the reactor and to introduce also the olefins being polymerised. Several methods for supplying catalyst to a polymerisation reactor have been described in the prior art.

U.S. Pat. No. 3,846,394 describes a process for the introduction of Ziegler-Natta catalyst slurry in a reactor. The process comprises the preparation of Ziegler-Natta catalyst slurry, the transfer of the slurry via a feed conduit from a storage zone to a metering zone, and the introduction of the slurry into a reactor. In order to avoid the back flow of monomer and other contents of the reactor into the Ziegler-Natta catalyst conduits the process provides the catalyst feed conduit to be flushed with a diluent inert to the Ziegler-Natta catalyst, said diluent being introduced into said conduit downstream of the metering zone.

WO 2004/026455 discloses a catalyst slurry feeding assembly for a polymerization reactor. Catalyst slurry is prepared in a mixing tank and subsequently fed to one or more storage tanks. The storage tanks include agitators so that the catalyst slurry is maintained at an essentially homogeneous solids-to-liquid ratio. From the storage tanks, the catalyst slurry is pumped to the polymerization reactor along a fluid passage having a flow meter. The flow of the catalyst slurry can be continuous and/or adjusted based on a measured parameter. A major drawback of the presented system is that it does not involve the introduction of catalyst to a polymerization reactor which has been pre-contacted with a suitable co-catalyst.

It is well known that the polymerisation reaction is quite sensitive to the quantity of catalyst utilized, and it is also known that the amount of catalyst added to the reactor is based on the flow rate of the catalyst to the reactor. However, one of the major problems in the injection of Ziegler-Natta catalyst slurry in a diluent to a reactor in prior art methods is that it is difficult to control the amount of Ziegler-Natta catalyst injected. Also, the catalyst tends to clog catalyst injection means such as pumps and the like and lines carrying the slurry.

For instance, U.S. Pat. No. 3,726,845 describes the supply and control of the amount of catalyst and the maintenance of the catalyst line and pump free by alternately feeding catalyst slurry and diluent to the reaction zone, allowing careful control of the amount of catalyst and control of the cleanliness of equipment such as lines and pumps and freedom from dogging.

GB 838,395 relates to a process and apparatus for producing a slurry of a solid catalyst in hydrocarbon diluent for use in a chemical reaction. The process comprises preparing concentrated catalyst slurry in a hydrocarbon diluent and admixing said concentrated slurry with additional diluent and introducing said admixture to a reaction zone. According to the process, the specific inductive capacity of the slurry is continuously determined prior to the introduction of same to said reaction zone, the inductive capacity of the slurry being dependent upon the concentration of catalyst in the slurry. The process further comprises regulating the ratio of concentrated slurry to added diluent responsive to variations of said specific inductive capacity from a predetermined value so as to maintain a slurry of substantially constant dielectric value.

Moreover, another problem relates to catalyst supply is that it has been difficult to control Ziegler-Natta catalyst flow rate in an adequate way. Ziegler-Natta catalyst flow rate is generally fixed for a certain operation and catalyst feeding systems do not account for variations in the feed flow rate.

Certain systems have been disclosed wherein the catalyst flow rate can be controlled and adapted. For instance, U.S. Pat. No. 5,098,667 discloses a system wherein a continuous flow of particulate solids is supplied to a polymerization reactor by continuously pumping a dilute catalyst slurry to the reactor. The flow rate of the dilute slurry is continuously manipulated so as to maintain a desired flow rate of solid particles contained in the dilute slurry to the reactor. In another example, U.S. Pat. No. 4,619,901 discloses a system wherein unreacted monomer concentration is maintained in the reaction effluent removed from a polymerization reactor by manipulating the catalyst feed rate to the polymerization reactor. A drawback of these above-mentioned systems is that these systems are rather complicated and rely on an adequate measurement of catalyst slurry characteristics and polymerization conditions.

Another problem relating to the field of catalyst supply t o a reactor consists of supplying a co-catalyst during a polymerisation reaction. It is known that the activity of certain Ziegler catalyst systems can be improved by increasing the quantity of organometallic compound used as the co-catalyst in this case, it is generally necessary to employ in the polymerization medium relatively large quantities of organometallic compounds as co-catalysts. However, this provides disadvantages including safety problems, related to the fact that these organometallic compounds spontaneously ignite on contact with air.

A number of techniques for the introduction of the co-catalyst has already been proposed. One technique consists for example of introducing the co-catalyst directly into the polymerization reactor. However, such methods do not allow bringing co-catalyst into contact with the Ziegler-Natta catalyst before entering the reactor, although such pre-contact is particularly desirable in order to provide effective Ziegler-Natta catalyst-co-catalyst mixtures.

Another technique consists of contacting the catalyst and co-catalyst before their introduction into the polymerization medium. For instance, U.S. Pat. No. 3,726,845 discloses a system and method wherein a Ziegler-Natta catalyst is brought into contact with an aluminum alkyl co-catalyst prior to be delivered upon mixture with a diluent to a polymerization reactor. In this latter case, however, it is difficult to control the pre-contact time of the catalyst with the co-catalyst Moreover, insufficient pre-contact of a catalyst with its co-catalyst may induce the formation of undesired waxes.

It is therefore a general object of this invention to provide an improved method for optimising catalyst introduction in a polymerisation reactor. It is an object of the present invention to optimise the supply of a Ziegler -Natta catalyst to a polymerisation reactor wherein polyethylene is prepared. More in particular, the present invention also aims to provide a method enabling to effectively control the flow rate of a catalyst, and in particular a Ziegler-Natta catalyst, to a polymerisation reactor wherein polyethylene is prepared.

It is another object the present invention to provide a method for supplying catalyst, and in particular a Ziegler-Natta catalyst, in pre-contact with a co-catalyst, to a polymerisation reactor, wherein polyethylene is prepared. The invention also aims to provide a method for preparing and supplying an optimised Ziegler-Natta catalyst-co-catalyst mixture to a polymerisation reactor.

Furthermore, the present invention aims to provide a device for preparing catalyst slurry, in particular a Ziegler-Natta catalyst and for supplying said catalyst slurry to a polymerisation reactor in a controlled and efficient way. Moreover, another aim of the invention is to provide a device for preparing a suitable catalyst-co-catalyst mixture and for supplying said mixture to a polymerisation reactor in a controlled and efficient way.

SUMMARY

The present invention relates in a first aspect to a method for optimising catalyst supply to a polymerisation reactor comprising the steps of
a) preparing catalyst slurry in a vessel, said slurry comprising solid catalyst in a hydrocarbon diluent having a suitable concentration for use in a polymerisation reaction,
b) providing said catalyst slurry from said vessel to a buffer vessel wherein said slurry is stored,
c) supplying said catalyst slurry from said buffer vessel to said reactor through conduits at a suitable flow rate, and
d) bringing a suitable amount of co-catalyst into contact with the catalyst slurry before supplying said catalyst slurry to said reactor.

The present invention is particularly characterised in that a suitable catalyst-co-catalyst mixture is supplied to the polymerisation reactor. In particular, the method comprises bringing a suitable amount of co-catalyst into contact with the catalyst slurry for a suitable period of time before supplying said catalyst slurry to said reactor. The present method provides a better contact and formation of a co-catalyst-catalyst mixture then in the case when co catalyst is directly supplied to a reactor. Supply of a suitable co-catalyst-catalyst mixture to the reactor provides a more controlled and more uniform level of polymerization reactivity in the reactor. Also, pre-contact between catalyst and co-catalyst positively influences the granulometry of the final polymerisation product and improves the bulk density and the settling efficiency of the polymerisation product prepared in the polymerisation reactor. Such method also enables to more precisely control the ratio of catalyst-co-catalyst injection. Surprisingly, addition of a co-catalyst to the catalyst slurry prior to injection in the polymerisation reactor does not induce dogging of injection means and the lines carrying the slurry.

The present method is in particular characterised in that the contact time of said co-catalyst with said catalyst slurry can be adequately controlled and adapted. The co-catalyst can be supplied to the catalyst slurry either in the buffer vessel, which is suitable when a relatively long pre-contact time is required between the catalyst and the co-catalyst. Alternatively, the method comprises bringing a co-catalyst, preferably a co-catalyst as defined above, into contact with said catalyst slurry present in said conduits connecting the buffer vessel to the polymerization reactor.

In a preferred embodiment, the contact time of said co-catalyst with said catalyst slurry in the conduits connecting the buffer vessel to the polymerization reactor is enhanced, by locally enhancing the volume of said conduits in accordance with the present method the pre-contact time between catalyst and co-catalyst prior to injection in the polymerization reaction can be well-controlled, and the formation of undesired waxes, which could cause dogging of the catalyst slurry supply lines and interruption of the catalyst feeding process, can be effectively avoided.

The present invention also provides in particular a method that enables to supply catalyst slurry to a reactor at a perfectly controllable flow rate of catalyst supply. Therefore, the present invention in particular provides a method, which comprises controlling the level of catalyst slurry in said buffer vessel. In an even more preferred embodiment, the invent ion provides a method comprising maintaining the level of catalyst slurry in said buffer vessel substantially constant between suitable ranges above a certain suitable level, and preferably between 80 and 90% of the vessel volume. Practically, the level of catalyst slurry in the buffer vessel is kept substantially constant by connecting a vessel wherein the slurry is prepared and containing a fluctuating amount of slurry to the buffer vessel. This connection enables to transfer slurry from the vessel to the buffer vessel when the level of shiny in the buffer vessel in going below said suitable level. By controlling the level of catalyst slurry having a suitable concentration in the buffer vessel at a substantially constant level, supply of catalyst slurry to a polymerisation reactor is ensured and can be performed in a controlled way.

In addition, according to another preferred embodiment, the present invention provides a method comprising controlling the suitable flow rate of said catalyst slurry to said reactor by determining the concentration of a reactant in said reactor. Advantageously the present method enables to fine-tune catalyst supply to a reactor in function of the polymerisation reaction in the reactor. The polymerisation production rate in the reactor can be controlled by controlling the rate of catalyst feed to the reactor. According to this aspect the reactor is fed with an adequate and optimal concentration of catalyst slurry at a suitable feed rate, and as a consequence the productivity in the polymerisation reactor and consistency of the polymerisation product are considerably improved. Fluctuations in the properties and quality of the polymerisation product resulting from the polymerisation reaction are substantially avoided. Practically, fine-tuning of catalyst supply to a reactor in function of the polymerisation reaction is enabled by providing the conduit connecting the buffer vessel to the reactor with pumping means, which are controllable and adjustable in function of a reactant concentration in the reactor.

In another aspect the present invention relates to a device for preparing and supplying catalyst to a polymerisation reactor comprising
- a vessel for preparing a catalyst slurry, said slurry comprising solid catalyst in a hydrocarbon diluent having a suitable concentration for use in a polymerisation reaction,
- a buffer vessel for storing said catalyst slurry at a suitable concentration for use in a polymerisation reaction, said buffer vessel being in connection with said vessel by means of one or more conduits and being provided with one or more conduits suitable for transferring said catalyst slurry from said buffer vessel to said reactor,
- a pumping means, provided on each of said conduit, for controlling the transfer and supply of said catalyst slurry from said buffer vessel to said reactor, and
- further comprising a co-catalyst distribution system, for bringing a suitable amount of co-catalyst into contact with the catalyst slurry before supplying said catalyst slurry to said reactor, said system comprising at least one co-catalyst storage vessel and a conduit connected thereto for transferring said co-catalyst from said co-catalyst storage vessel to said buffer vessel and/or to said one or more conduits connecting the buffer vessel with the reactor.

The present invention provides a device that allows preparing catalyst slurry having a suitable concentration for use in a polymerisation reaction. Said catalyst is prepared in the vessel, where addition of a hydrocarbon diluent is controlled in such a way as to allow slurry having a suitable concentration, preferably comprised between 0.1 and 10% by weight, to be made.

In addition, the device allows supplying catalyst slurry in a controlled way to a polymerisation reactor. Therefore, the device is in particular provided with a buffer vessel, wherein the amount of slurry is kept at a substantially constant level, preferably between 80% and 90% of the vessel volume, such that fluctuations in the transfer of slurry from the buffer vessel to a reactor are avoided. The amount of slurry in the buffer vessel is kept at said substantially constant level, by constantly refilling the buffer vessel with slurry prepared in the vessel, once the amount of slurry in the buffer vessel goes below said suitable level.

Moreover, the present invention provides a device that enables to adjust catalyst flow to said reactor in function of the concentration of reactants and thus as a function of the polymerisation reaction in said reactor. Therefore, the present device is provided with a pumping means on each conduit for transferring and supplying the catalyst slurry from the buffer vessel to the reactor. Via a feed back mechanism, the pumping means are capable of being adjusted and of fine-taming the catalyst flow rate to the reactor in function of the concentration of a reactant in said reactor.

The present invention provides a method for optimising the polymerisation reaction in a reactor by optimising the process of catalyst supply to said reader and by providing a device for doing so, which is simple in design, rugged in construction and economical to manufacture. The term "optimising the polymerisation reaction" refers to the improvement of the efficiency of the polymerization reaction and/or improvement of the quality of the polymerization product obtained.

The method and the device according to the invention are particularly useful in the polymerisation process of ethylene, and preferably in a process for preparing bimodal polyethylene.

The various features which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE FIGURES

DETAILED DESCRIPTION OF THE INVENTION

This invention is especially applicable to a process of supplying a catalyst to a polymerisation reactor. The invention is in particular described with reference to the supply of catalyst to a polymerization reactor wherein ethylene is polymerised. The polymerization process of ethylene may for instance be carried out in loop reactors. Suitable "ethylene polymerization" includes but is not limited to homo-polymerization of ethylene, co-polymerization of ethylene and a higher 1-olefin co-monomer such as butene, 1-pentene, 1-hexene, 1-octene or 1-decene. Ethylene polymerization comprises feeding to a reactor the reactants including the monomer ethylene, a light hydrocarbon diluent, a catalyst and optionally, a co-monomer and hydrogen. In an embodiment of the present invention, said co-monomer is hexene and said diluent is isobutane.

In a particularly preferred embodiment, the invention relates to a process of supplying a catalyst to a polymerisation reactor wherein bimodal polyethylene is prepared. "Bimodal PE" refers to PE that is manufactured using two reactors, which are connected to each other in series. However, the present method for improving and optimising catalyst supply to a polymerisation reactor should be understood to be applicable to reactors wherein other types of polymerisation reactions take place as well.

According to the present invention the term "catalyst" is defined herein as a substance that cause a change in the rate of a polymerization reaction without itself being consumed in the reaction. According to a preferred embodiment said catalyst is a Ziegler-Natta catalyst. Any of the conventional supported Ziegler-Natta transition metal compound catalyst components can be used in the present invention.

The Ziegler-Natta catalyst is preferably of the general formula $MX_n$ wherein M is a transition metal compound selected from group IV to VII, wherein X is a halogen, and wherein n is the valence of the metal. Preferably, M is a group IV, group V or group VI metal, more preferably titanium, chromium or vanadium and most preferably titanium. Preferably, R is chlorine or bromine, and most preferably, chlorine. Illustrative examples of the transition metal compounds comprise but are not limited to $TiCl_3$, $TiCl_4$. In a particularly preferred embodiment of the invention said catalyst is a titanium tetrachloride ($TiCl_4$) catalyst Ziegler-Natta catalysts generally are provided on a support, i.e. deposited on a solid crystalline support. The support should be an inert solid, which is chemically unreactive with any of the components of the conventional Ziegler-Natta catalyst. The support is preferably a magnesium compound. Examples of the magnesium compounds which are to be used to provide a support source for the catalyst component are magnesium halides, dialkoxymagnesiums, alkoxymagnesium halides, magnesium oxyhalides, dialkylmagnesiums, magnesium oxide, magnesium hydroxide, and carboxylates of magnesium.

The term "co-catalyst" as used herein is defined as a catalyst that can be used in conjunction with another catalyst in order to improve the activity and the availability of the other catalyst in a polymerisation reaction. In a preferred embodiment, said co-catalyst is a catalyst suitable for being used in conjunction with a Ziegler-Natta catalyst. The co-catalyst is used to promote the polymerization activity of the Ziegler-Natta catalyst. Broadly, organometallic compounds of periodic groups I to III can be used as on catalyst according to the present invention. In a particularly preferred embodiment, said co-catalyst is a catalyst suitable for being used in conjunction with a Ziegler-Natta catalyst and is an organoaluminium compound, being optionally halogenated, having general formula $AlR_3$ or $AlR_2Y$, wherein R is an alkyl having 1-16 carbon atoms and R may be the same or different and wherein Y is hydrogen or a halogen. Examples of co-catalysts comprise but are not limited to trimethyl aluminum, triethyl aluminum, di-isobutyl aluminum hydride, is tri-isobutyl aluminium, tri-hexyl aluminum, diethyl aluminum chloride, or diethyl aluminum ethoxide. A particularly preferred co-catalyst for use in the present invention is tri-isobutyl aluminium (TIBAL).

The invention will be described hereunder with reference to a method and device for supplying a Ziegler-Natta catalyst, in particular a titanium tetrachloride ($TiCl_4$) catalyst to a polymerisation reactor wherein ethylene is polymerised. As co-catalyst for the Ziegler-Natta catalyst, reference is made to a tri-isobutyl aluminium co-catalyst. However, it should be clear that the present device is applicable to other types of catalysts and co-catalysts as well.

As used herein, the term "catalyst slurry" refers to a composition comprising catalyst solid particles that are in suspension in a diluent. According to a preferred embodiment of this invention, the catalyst solid particles are Ziegler-Natta catalyst solid particles and the diluent is isobutane.

The hereunder-described device corresponds to the required equipment for preparation and injection of one catalyst. If two or more (different) catalysts need to be fed to a reactor, two or more devices according to the present invention can be supplied or a catalyst blend can be prepared and supplied using a device according to the present invention. It is also clear that in case two or more reactors are used, one or more devices according to the invention can be used, in the two or more reactors, as desired.

Figure 1:
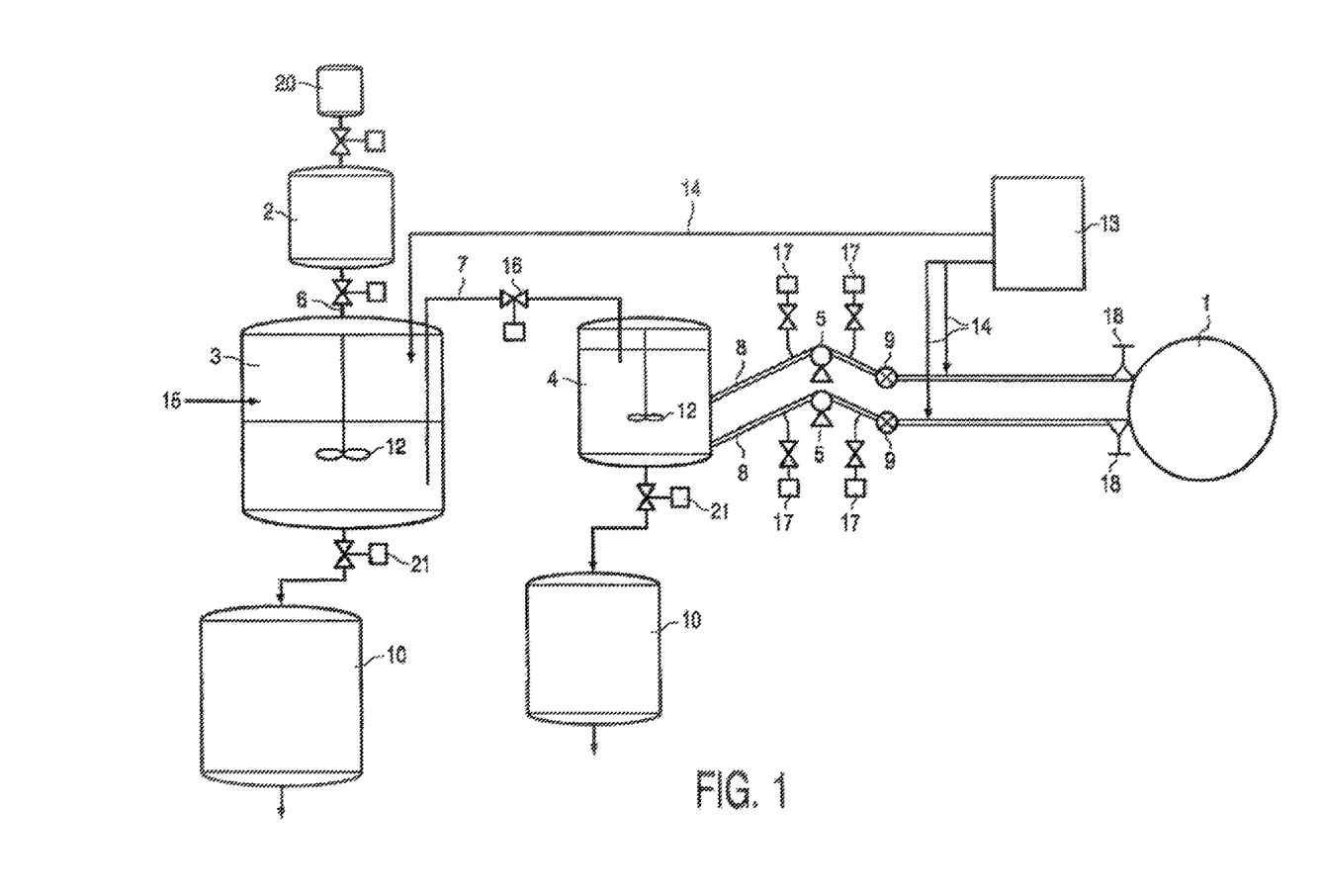
FIG. 1 is a schematic representation of a preferred embodiment of a device a wording to the invention for preparing and supplying catalyst to a polymerisation reactor.

Referring to FIG. 1 a preferred embodiment of a device according to the present invention is illustrated. In general, the device according to the invention comprises a vessel 3 for preparing catalyst slurry and a buffer vessel 4 for storing said catalyst slurry at a suitable concentration for use in a polymerisation reaction. The catalyst slurry is continuously pumped from the buffer vessel 4 to a reactor 1 through one or more conduits 8. The constructional details of valves, pumps etc. have been omitted in the drawings for clarity, it being within the skill of the art to supply these.

The Ziegler-Natta catalyst $TiCl_4$ is solid and is generally provided under a dry form in commercially available drums 20. In general such drums containing dry catalyst powder are not able to handle high pressures. For instance, the pressure in such drum may comprise approximately between 1.1 and 1.5, and preferably 1.3 bar. Using appropriate systems, the catalyst is therefore preferably transferred from such drums to a container vessel 2, which is suitable for handling higher pressures, if this is required by the diluent. Depending on the diluent used, it may be required to bring the catalyst under higher pressure conditions in the container vessel 2. This is for instance the case when isobutane is used, since this diluent is only liquid at higher pressure levels. In case for instance hexane is used as diluent, container vessel 2 is not required, since this diluent is liquid at low pressures.

The container vessel 2 is generally much larger than the drums 20 and is suitable for handling higher pressure levels than the drums, preferably between 1.1 and 16 bar. Purging in such container vessel 2 is preferably performed by means of nitrogen and venting to the flare.

According to a preferred embodiment, the Ziegler-Natta catalyst is provided from drums 20 to a container vessel 2. However, in an alternative embodiment, the Ziegler Natta catalyst can also be provided in a commercial container that is suitable for handling higher pressure comprised between 1.1 and 16 bar, and preferably of 6 bar. In such case the use of a container vessel 2 is not required, and the catalyst can be fed directly from the commercial container to a preparation vessel 3.

Catalyst slurry having a suitable concentration is prepared according to the invention in a vessel 3. The catalyst slurry comprises solid catalyst in a hydrocarbon diluent. When using $TiCl_4$ as catalyst, hydrocarbons such as hexane or isobutane can be used to dilute the catalyst and to obtain a catalyst slurry. However, a major disadvantage of using hexane as diluent to prepare the catalyst is that a portion of hexane generally ends up in the final polymer product, which is undesirable. Isobutane on the other hand is easier to handle, to purify and to re-use in the polymerisation process than hexane. For instance, since in the polymerisation process of ethylene, isobutane is applied as diluent in the reaction, isobutane used as diluent for the catalyst can easily be re-used in the polymerisation process. Therefore, in a preferred embodiment, isobutane is used as diluent for the $TiCl_4$ catalyst in a particularly preferred embodiment, pure isobutane is used to prepare the catalyst. Isobutane is generally present in gas form at room temperature and at atmospheric pressure. In other to obtain liquid isobutane for preparing the catalyst slurry, increased pressures need to be obtained. Therefore, the solid catalyst particles are provided to a container vessel 2, and later on to a vessel 3, wherein an increased pressure, preferably comprised between 7 and 16 bar, and preferably of 8 bar can be applied.

The transfer of the Ziegler-Natta catalyst from the container vessel 2 to the vessel 3 is preferably done by gravity. Before transferring the Ziegler-Natta catalyst from the container vessel 2 to the vessel 3, isobutane is ad miffed into the vessel 3. The vessel 3 is provided with an inlet system 15 for supply of this diluent. The diluent is filled in the vessel 3, and the container vessel 2 is emptied. To avoid remaining catalyst in container vessel 2, the vessel is flushed with isobutane, such that remaining catalyst is transferred to the preparation vessel 3.

The preparation vessel 3 is agitated by means of stirring or mixing means 12 provided in said vessel to maintain the homogeneity of the catalyst slurry.

Preferably catalyst slurry comprising solid catalyst in a hydrocarbon diluent is prepared having a concentration comprised between 0.1 and 10% by weight, and even more preferred having a concentration comprised between 0.5 and 5% by weight, and even more preferred between 3 and 4% by weight. Preparing diluted catalyst slurry having these concentrations advantageously enables the further use of diaphragm pumps 5 for injecting the catalyst slurry in the reactor 1, as described into more detail below. In case other concentrations of catalyst slurry would be applied, it is clear that other types of pumping means can be applied.

After homogenous Ziegler-Natta catalyst slurry has been prepared in the vessel 3, the catalyst slurry is transferred from the vessel 3 to the buffer vessel 4 by way of one or more conduits 7 connecting the vessel 3 to a buffer vessel 4. A control valve 16 is involved in the transfer from the vessel 3 to the buffer vessel 4. The transfer can take place manually or automatically. Preferably the trans far of catalyst slurry from the vessel 3 to the buffer vessel 4 is performed by means of tubes 7 controlled by pumping means. Said pumping means preferably comprise dip pumps. The amount of catalyst slurry in the buffer vessel 4 is kept at a substantially constant level by pumping catalyst slurry prepared in the vessel 3 to the buffer vessel 4, once the amount of catalyst slurry in the buffer vessel 4 goes below a certain level.

According to a preferred embodiment, the amount of catalyst slurry prepared in the vessel 3 fluctuates. In a preferred embodiment, the vessel 3 is fed with Ziegler-Natta catalyst from the container vessel 2, at the moment that the level in the vessel 3 is below 20% and even more preferred below 35%. Lower values may lead to unwanted fluctuations in the concentration of the catalyst slurry in the vessel 3 and can cause the transfer of catalyst slurry to the buffer vessel 4, wherein a substantially constant level of catalyst slurry is maintained, to be interrupted, leading to fluctuating levels of catalyst slurry in the buffer vessel 4 as well, which is undesirable according to the present invention.

However, while the amount of catalyst slurry in the vessel 3 may vary, the level of catalyst slurry in the buffer vessel 4 is substantially constant, i.e. above a certain level and between certain suitable ranges. The level of catalyst slurry in the buffer vessel 4 is substantially constant between 40 and 100% of the vessel volume, and more preferred between 60 and 95%, and even more preferred between 80 and 90%. In order to maintain such substantially constant level of catalyst slurry in the buffer vessel 4, slurry is transferred from the vessel 3 to the buffer vessel 4, whenever the level of catalyst slurry in the buffer vessel 4 reaches a level below 40% and more preferred a level below 60%, or even more preferred a level below 80%.

In one example, the catalyst slurry level in the buffer vessel can be determined by pressure measurement, e.g. by measuring the pressure in the lower part of the vessel and in the upper part of the vessel.

The buffer vessel 4 is preferably large enough to contain sufficient catalyst slurry and large enough such that a day vessel capacity is equivalent to the time to prepare a new batch. This enables to assure the continuous production and availability of the catalyst in the polymerisation reaction. In addition, in another preferred embodiment, the pressure in the buffer vessel 4 is preferably maintained between 6 and 16 bar and preferably at 7 bar.

Catalyst wastes can be sent through a conduit, which is provided with a control valve 21, to one or more dump vessels 10. The preparation vessel 3 and the buffer vessel 4 can be emptied in a common or in separate dump vessels 10. Preferably said dump vessel 10 are larger than the vessel 3 and the buffer vessel 4. In case of the preparation of unsuitable catalyst, these can be emptied from the vessels 3, 4 to these dump vessels 10. The dump vessel 10 is preferably a heated vessel, having a steam jacket, where the diluent, i.e. isobutane, is evaporated. The steam jacket is preferred, for desorbing isobutane. The evaporated diluent is sent to distillation or to the flare. In order to avoid the transfer of catalyst fragments when transferring the evaporated diluent, guard filters are provided with the dump vessels 10. The dump vessels 10 are also provided with pressure controlling means for controlling the pressure in said vessels. The catalyst waste remaining after evaporation of the diluent is removed from the yes sets 10, preferably by means of a draining system, provided at the bottom of the vessel 10, and the removed waste is discharged into drums and further destroyed.

The Ziegler-Natta catalyst slurry is subsequently transferred from the buffer vessel 4 to the reactor 1 through one or more conduits 8. The conduits 8 preferably have a diameter comprised between 0.3 and 2 cm, and preferably between 0.6 and 1 cm. Each conduit 8 is provided with a pumping means 5, which controls the transfer and injection of the Ziegler-Natta catalyst slurry into the reactors 1. In a particularly preferred embodiment, said pumping means are diaphragm pumps.

Figure 2:
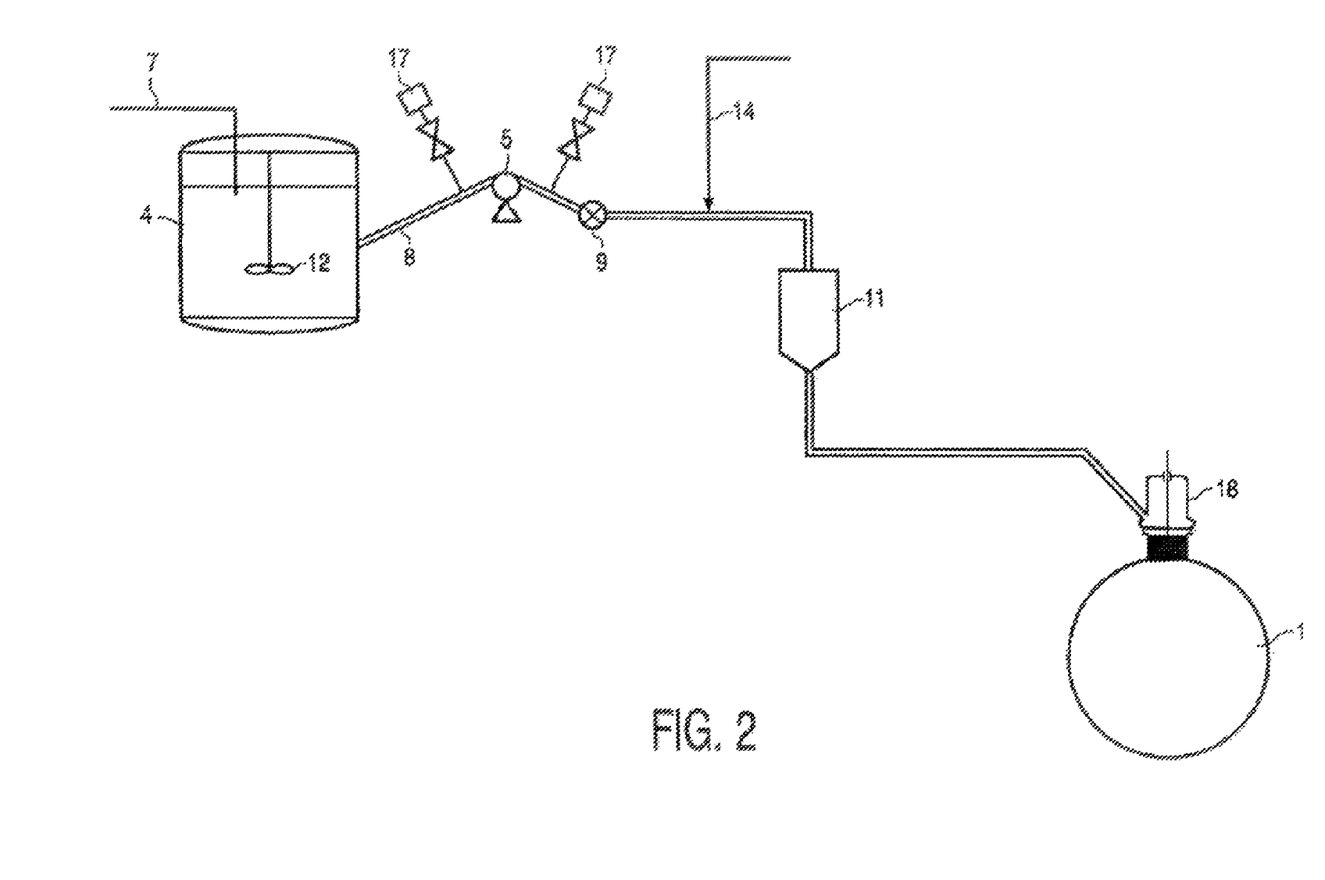
FIG. 2 is a detailed representation of a system for bringing a co-catalyst into contact with catalyst slurry in a device according to the present invention.

As represented in FIG. 2, the conduits 8 preferably leave the buffer vessel 4 upwardly under an angle preferably superior to 10°, and more preferably superior to 30°. in addition, the conduit provided downwards the pumping means 5 conducts the catalyst slurry downwardly, under an angle preferably superior to 10°. Such configuration improves the action of the pumping means 5 and also enables to avoid plugging in the pumping means 5 since under this configuration the catalyst slurry tends to settle away from the pumps 5 in case the pumps 5 are interrupted or stopped.

The conduits 8 are further provided with a pulsation dampener, safety valves and isobutane flushing means 17, either at the inlet, at the outlet or at both sides of the diaphragm pumps 5, as illustrated on FIG. 2. Isobutane flushing means 17 enable to flush isobutane through the conduit 8 and to keep the conduits 8 an d the pumping means 5 unplugged When different conduits 8 are provided for connecting the buffer vessel 4 to the reactor 1, generally, one conduit having one active pumping means 5 will be operative, while the other conduits 8 and pumping means 5 will not be operative but will be kept in stand by mode. In this latter case, the conduit 8 remains open and the pumping means 5 will preferably be constantly Rushed with a suitable stream of diluent.

In order to reduce the risk of leakage, the catalyst should be stored at a lower pressure than the reactor which is generally comprised around 43 bar, e.g. stored in the buffer vessel at approximately 7 bar.

The pressure in the conduits 8 is preferably comprised between 45 and 65 bar. This elevated pressure, in comparison with the pressure values provided in the vessel 3 and the buffer vessel 4, is required in order to bring the catalyst under sufficient pressure into the reactor.

It is important to control correctly the catalyst flow to the reactor and to pump catalyst slurry into the reactor at a controlled and limited flow. An unexpected flow to the reactor could lead to a runaway reaction. A fluctuating flow to the reactor could lead to reduced efficiency and fluctuations in product quality. Therefore, in a particularly preferred embodiment, the injection pump 5 flow rates are controlled by the reactors' 1 activity. The pumping means are in particular controllable in function of the concentration of a reactant in said reactor. Preferably said reactant is the concentration of monomer, i.e. ethylene, in the reactor. However, it should be clear that the pumping means are controllable in function of the concentration of other reactants, such as e.g. the co-monomer or hydrogen concentrations in the reactor as well. By the use of pumping means 5 the invention provides for a good control of the catalyst flow. In particular, the Ziegler-Natta catalyst flow rate to the reactors is controlled by adjusting the stroke and/or frequency of the diaphragm pumps. Furthermore, the pump flow rates are controlled by the ethylene concentration in the reactor. In case the ethylene concentration is high in the reactor, more catalyst will be added to the reactor and vice versa. In this way, the variations in ethylene polymerisation rate are taken into account and actual production rate and product properties do not fluctuate significantly.

In addition, the conduits 8 are further provided with flow measuring means 9 for easily measuring the catalyst flow rate in the conduits 8. These flow measuring means 9 preferably are Coriolis flow measuring means that are preferably provided downstream from said pumping means 5.

In a further embodiment, the present device is further provided with a co-catalyst distribution system, for bringing a co-catalyst into contact with said catalyst slurry before supplying said catalyst slurry to said reactor. When using a Ziegler-Natta catalyst, tri isobutyl aluminium (TIBAL) is preferably used as co-catalyst. Such co-catalyst acts as a real catalyst, which means that the co-catalyst participates to the polymerisation reaction in the reactor.

The co-catalyst distribution system 13 may comprises two co-catalyst storage vessels wherein co-catalyst is prepared and stored. One vessel comprises a high level of co-catalyst and is in connection via a conduit 14 to the preparation vessel 3 for supply of co-catalyst thereto. This vessel can also be in connection to the conduit 8 for providing co-catalyst thereto. Mother vessel is in connection to the conduit 8 through conduit 14, for transferring said co-catalyst to the conduit 8, as illustrated on FIG. 2.

The contact time between the Ziegler-Natta catalyst and the TIBAL co-catalyst and the ratio between the Ziegler-Natta catalyst and the TIBAL co-catalyst have an important influence on the granulometry but also on the activity of the final polymerisation product. Using a TIBAL co-catalyst, bigger polyethylene particles can be obtained through activity. Also, pre-contact of the TIBAL co-catalyst with the Ziegler-Natta catalyst improves the bulk density and the settling efficiency of the polyethylene prepared in the polymerisation reactor. Depending on the pre-contact time desired, a suitable amount of TIBAL co-catalyst is injected either in the vessel 3, in case a long pre-contact time is required between the Ziegler-Natta catalyst and the TIBAL co-catalyst, or in the conduits 8, downstream the diaphragm pumps 5, before entering the reactors 1, in case a short pre-contact time is required between the Ziegler-Natta catalyst and the TIBAL co-catalyst.

Co-catalysts are generally provided in commercial drums. In a storage vessel of the co-catalyst distribution system 13, the TIBAL co-catalyst is generally provided in a solution of hexane, but can be provided in pure form to c. The TIBAL co-catalyst is transferred from the storage vessel through a co-catalyst injection conduit 14, in the conduit 8, which connects the buffer vessel 4 with the reactor 1. Conduit 14 intersects conduit 8, downstream the diaphragm pumps 5 and upstream the reactor 1. In case a flow measuring means 9 is further provided on the conduits 8, the co-catalyst feeding conduit 14 intersects the conduit 8, preferably downstream of said flow meter 9.

In case the TIBAL co-catalyst is injected in the conduit 8, the injection point is at a distance from the reactor allowing a certain pre-contact time with the catalyst before being supplied to the reactor. In order to have a sufficient pre-contact time, preferably between 5 seconds and 2 minutes, and for instance between 5 seconds and 1 minute, between the Ziegler-Natta catalyst stony and the TIBAL co-catalyst, small contact vessels 11 are installed on the conduits 8, downstream the injection point of the co-catalyst distribution system. Preferably, said contact vessels 11 are positioned vertically in said conduits 8. The contact vessels can be agitated or not.

Preferably said contact vessels comprise a conduit which has a diameter which is at least 1.5 to 50 times larger, and for instance 2, 3, 5, 10, 15, 20, 25, 30, 35, 40, 45 or 50 times larger than the diameter of said conduits 8. In a preferred embodiment, the conduits 8 have a diameter comprised between 0.3 and 2 cm, and preferably comprised between 0.6 and 1 cm while the diameter of the contact vessels 11 is preferably comprised between 1 and 15 cm and preferably between 6 and 9 cm.

In another preferred embodiment, by operation in accordance with the present invention, all lines, vessels, pumps, valves, etc. can be kept free of dogging by means of flushing or purging with nitrogen or diluent, i.e. isobutane. It is to be understood that where necessary flushing and purging means and fines are available on the device according to the invention in order to avoid plugging, or blocking.

In an example, using the device according to the present invention, a drum of 80 kg comprising solid Ziegler-Natta catalyst is diluted in approximately 2000 kg of diluent isobutane. This amount of catalyst enables to prepare 1.000.000 kg of polyethylene, and the prepared catalyst is suitable for feeding a reactor at a slow flow rate during 4 to 5 days.

In another embodiment, the catalyst slurry is injected under controlled flow into the reactor. The conduits 8 for transferring catalyst slurry into to the reactor are equipped by one or more valves, preferably piston valves 18. The piston valves 18 are capable of sealing the orifice by which the conduit 8 is connected to the reactor 1, as illustrated on FIG. 2. When using different conduits 8 for transferring catalyst slurry to on a reactor, only in one conduit 8 the pumping means actively pump catalyst slurry to the reactor, while in other conduits 8 the pumps are not active and the conduits are preferably flushed by isobutane.

The device according to the invention can be applied for feeding a single polymerisation reactor. In a preferred embodiment the device according to the invention is applied for feeding a polymerisation reactor consisting of two liquid full loop reactors, comprising a first and a second reactor connected in series by one or more settling legs of the first reactor connected for discharge of slurry from the first reactor to said second reactor. Such in series connected reactors are particularly suitable for the preparation of bimodal polyethylene. The present device, comprising the container vessel Z the vessel 3, the buffer vessel 4 and the co-catalyst storage distribution system 13, and optionally one or more dump vessels 10, can be applied for both reactors. The number of conduits 8 can be divided between the first and the second reactor. It is also possible to use two catalyst preparation and injection device, e.g. when two different catalysts are used.

It is dear from the present description that numbers of dimensions of the different parts of the device relate to the size of the polymerization reactors and can be changed in function of the reaction sizes.

In another embodiment, the present invention relates to a method for optimising catalyst supply to a polymerisation reactor 1 comprising the steps of
  a) preparing catalyst slurry in a vessel 3, said slurry comprising solid catalyst, preferably a Ziegler-Natta catalyst as defined above, in a hydrocarbon diluent having a suitable concentration for use in a polymerisation reaction,
  b) providing said catalyst slurry from said vessel 3 to a buffer vessel 4 wherein said slurry is stored,
  c) supplying said catalyst slurry from said buffer vessel 4 to said reactor 1 through conduits 8 at a suitable flow rate, and
  d) bringing a suitable amount of co-catalyst into contact with the catalyst slurry before supplying said catalyst slurry to said reactor.

Preferably, said method is a method for optimising catalyst supply to a polymerisation reactor 1 wherein polyethylene, and preferably bimodal polyethylene, is prepared.

In certain cases it might be required or advantageous to bring the catalyst into contact with a co-catalyst, as indicated above. Therefore, the present method is in particular characterised in that it comprises the step of bringing a co-catalyst into contact with said catalyst slurry before supplying said catalyst slurry to said reactor. The co-catalyst is preferably an aluminium based compound as defined above.

The co-catalyst can be supplied to the catalyst slurry either in the vessel 3, which is suitable when a relatively long pre-contact time is required between the catalyst and the co-catalyst Alternatively, the method comprises bringing a co-catalyst, preferably a co-catalyst as defined above, into contact with said catalyst slurry present in conduits 8. The co-catalyst distribution system 13 preferably comprises a storage vessel and a conduit 14 intersecting the conduit 8. In another preferred embodiment, the method further comprises enhancing the contact time of said co-catalyst with said catalyst slurry in conduits 8, by locally enhancing the volume of said conduits 8. By locally enhancing the volume of the conduits, a better pre-contact between co-catalysts and catalysts is obtained. Pre-contact between catalyst and co-catalyst positively influences the granulometry of the final polymerisation product and improves the bulk density and the settling efficiency of the polymerisation product prepared in the polymerisation reactor. During the activation process, if too much co-catalyst contacts the catalyst particle, the catalytic activity is not only reduced, but actual harm may result. The present method also advantageously enables to more precisely control the ratio of catalyst/co-catalyst injection.

The catalyst slurry is generally prepared from solid catalyst, which is suspended in a hydrocarbon diluent. Since solid catalyst is generally provided in commercial drums, under conditions that do not allow the preparation of catalyst slurry, e.g. the commercial drums are too small or do not allow to apply increased pressure, if required by the used diluent. Depending on the diluent used, it may be required to bring the catalyst under higher pressure conditions. Therefore, in a preferred embodiment said method further comprises the additional step of transferring solid catalyst from a container vessel 2 to the vessel 3, wherein diluted catalyst slurry of a suitable concentration is prepared. Alternatively, the Ziegler-Natta catalyst can also be provided in a commercial container that is suitable for handling higher pressures. In such case the use of a container vessel 2 is not required, and the concentrated catalyst slurry can be fed directly from the commercial container to a preparation vessel 3.

Preferably, the method comprises controlling the level of catalyst slurry in said buffer vessel 4. Even more preferred the invention relates to a method for maintaining the level of catalyst slurry in said buffer vessel 4 substantially constant This is in particular enabled by providing two vessels, a vessel 3 wherein the slurry is prepared and which is allowed to have a fluctuating amount of catalyst slurry comprised therein, and a buffer vessel 4, containing a substantially constant level of catalyst slurry, preferably between 40% and 100% and more preferred between 60% and 95% and even more preferred between 80% and 90%. The level of catalyst slurry in the buffer vessel 4 is kept constant by contacting the buffer vessel 4 to the vessel 3 through tubes 7, in particular tubes under the control of pumping means. Through these tubes 7, catalyst slurry is pumped from the vessel 3 to the buffer vessel 4 when the level of catalyst slurry in the buffer vessel 4 in going down the above-indicated values. By this mechanism continuous supply of catalyst slurry without relevant fluctuations to a polymerisation reactor is ensured. The polymerisation reactor will thus continuously be provided with catalyst slurry at a suitable concentration, which will increase the efficiency of the polymerisation reaction in the reactor.

In another embodiment, the method according to the invention comprises controlling the suitable flow rate of the catalyst slurry to the reactor 1 by determining the concentration of a reactant in said reactor 1. Preferably said reactant is the concentration of monomer, i.e. ethylene, in the reactor. However, it should be clear that also determination of other reactants, such as e.g. the co-monomer or hydrogen concentrations in the reactor, is comprised within the scope of the present invention. Practically, this mechanism is obtained by providing each conduit for transferring and supplying the catalyst slurry from the buffer vessel to the reactor with a pumping means, that is capable of being adjusted and regulating the catalyst flow rate in function of the concentration of a reactant in said reactor.

In certain cases it might be required or advantageous to bring the catalyst into contact with a co-catalyst, as indicated above. Therefore, the present invention further provides a method comprising the step of bringing a co-catalyst into contact with said catalyst slurry before supplying said catalyst slurry to said reactor. The co-catalyst is preferably an aluminium based compound as defined above.

The co-catalyst can be supplied to the catalyst slurry either in the vessel 3, which is suitable when a relatively long pre-contact time is required between the catalyst and the co-catalyst Alternatively, the method comprises bringing a co-catalyst, preferably a co-catalyst as defined above, into contact with said catalyst slurry present in conduits 8. The co-catalyst distribution system 13 preferably comprises a storage vessel and a conduit 14 intersecting the conduit 8. In another preferred embodiment, the method further comprises enhancing the contact time of said co-catalyst with said catalyst slurry in conduits 8, by locally enhancing the volume of said conduits 8. By locally enhancing the volume of the conduits, a better pre-contact between co-catalysts and catalysts is obtained. Pre-contact between catalyst and co-catalyst positively influences the granulometry of the final polymerisation product and improves the bulk density and the setting efficiency of the polymerisation product prepared in the polymerisation reactor. During the activation process, if too much co-catalyst contacts the catalyst particle, the catalytic activity is not only reduced, but actual harm may result. The present method also advantageously enables to more precisely control the ratio of catalyst/co-catalyst injection.

In another preferred embodiment, the present invention provides a method for continuously supplying catalyst slurry from the buffer vessel 4 to the reactor 1 through conduits 8 at a suitable flow rate. In a preferred embodiment, the present invention provides in particular a method that enables to continuously supply catalyst to a reactor, without interruption of the catalyst flow.

In yet another preferred embodiment, the invention relates to a method wherein catalyst flow rate to the reactor is accurately measured, through liquid flow rate measurement, using flow measuring means, such as preferably Coriolis flow measuring means.

While the invention has been described in terms of the presently preferred embodiment, reasonable variations and modifications are possible by those skilled in the art and such variations are within the scope of the described invention and the appended claims.

The invention claimed is:

1. A method for supplying a catalyst to an ethylene slurry loop polymerization reactor comprising:
   a) preparing a catalyst slurry in a preparation vessel wherein said slurry comprises a hydrocarbon diluent liquid which contains a Ziegler-Natta catalyst;
   b) supplying said catalyst slurry from said preparation vessel to a buffer vessel;
   c) withdrawing said catalyst slurry from said buffer vessel and supplying said catalyst slurry to a slurry loop polymerization reactor in which ethylene is polymerized;
   d) mixing a co-catalyst with the Ziegler-Natta catalyst in said slurry prior to the supplying of said catalyst slurry to said slurry loop polymerization reactor; and
   e) controlling the transfer of catalyst slurry from said preparation vessel to said buffer vessel and the withdrawal of catalyst slurry from said buffer vessel to maintain the level of catalyst slurry in said buffer vessel at 80 to 90 percent.

2. The method of claim 1 comprising mixing said co-catalyst with said catalyst slurry while transferring said catalyst slurry through a conduit to said polymerization reactor.

3. The method of claim 2 wherein the contact time of the co-catalyst with said catalyst slurry is increased by providing a chamber of increased volume in said conduit at a location between the mixing of said co-catalyst into said slurry and the introduction of said slurry into said polymerization reactor.

4. The method of claim 2 wherein said co-catalyst is mixed with said catalyst slurry by supplying said co-catalyst to said preparation vessel.

5. The method of claim 1 wherein the Ziegler-Natta catalyst is characterized by the formula:

$$MX_n$$

wherein: M is a transition metal compound selected from group IV to VIII of the Periodic Table of Elements, X is a halogen, and n is the valence of the metal M.

6. The method of claim 5 wherein said co-catalyst is an organo aluminum compound having the formula:

$$AlR_3 \text{ or } AlR_2Y$$

wherein R is an alkyl group having 1-16 carbon atoms which may be the same or different and Y is hydrogen or a halogen.

7. The method of claim 1, wherein the volume of catalyst slurry in said buffer vessel is maintained within the range of 80% to 90% of the volume of said buffer vessel.

8. The method of claim 1 further comprising storing said Ziegler-Natta catalyst in a container vessel at a designated pressure and transferring said solid catalyst from said container vessel to said preparation vessel which is maintained at a higher pressure than the pressure in said container vessel.

9. The method of claim 1 wherein the buffer vessel is maintained at a lower pressure than the pressure within said slurry loop polymerization reactor.

10. The method of claim 9 wherein the pressure in said buffer vessel is within the range of 6-16 bar.

11. The method of claim 1 wherein said catalyst slurry is withdrawn from said buffer vessel and supplied to said slurry loop reactor through a plurality of conduits extending from said buffer vessel to said slurry loop reactor.

12. The method of claim 11 wherein said conduits are provided with pumps at a locations intermediate said buffer vessel and said reactor and wherein said conduits extending from said buffer vessel to the locations of said pumps extend upwardly from said buffer vessel to said pumps by an angle of at least 10 degrees.

* * * * *